March 5, 1935. A. M. BUTTERFIELD 1,993,475
STEERING GEAR
Filed May 13, 1933 2 Sheets-Sheet 1
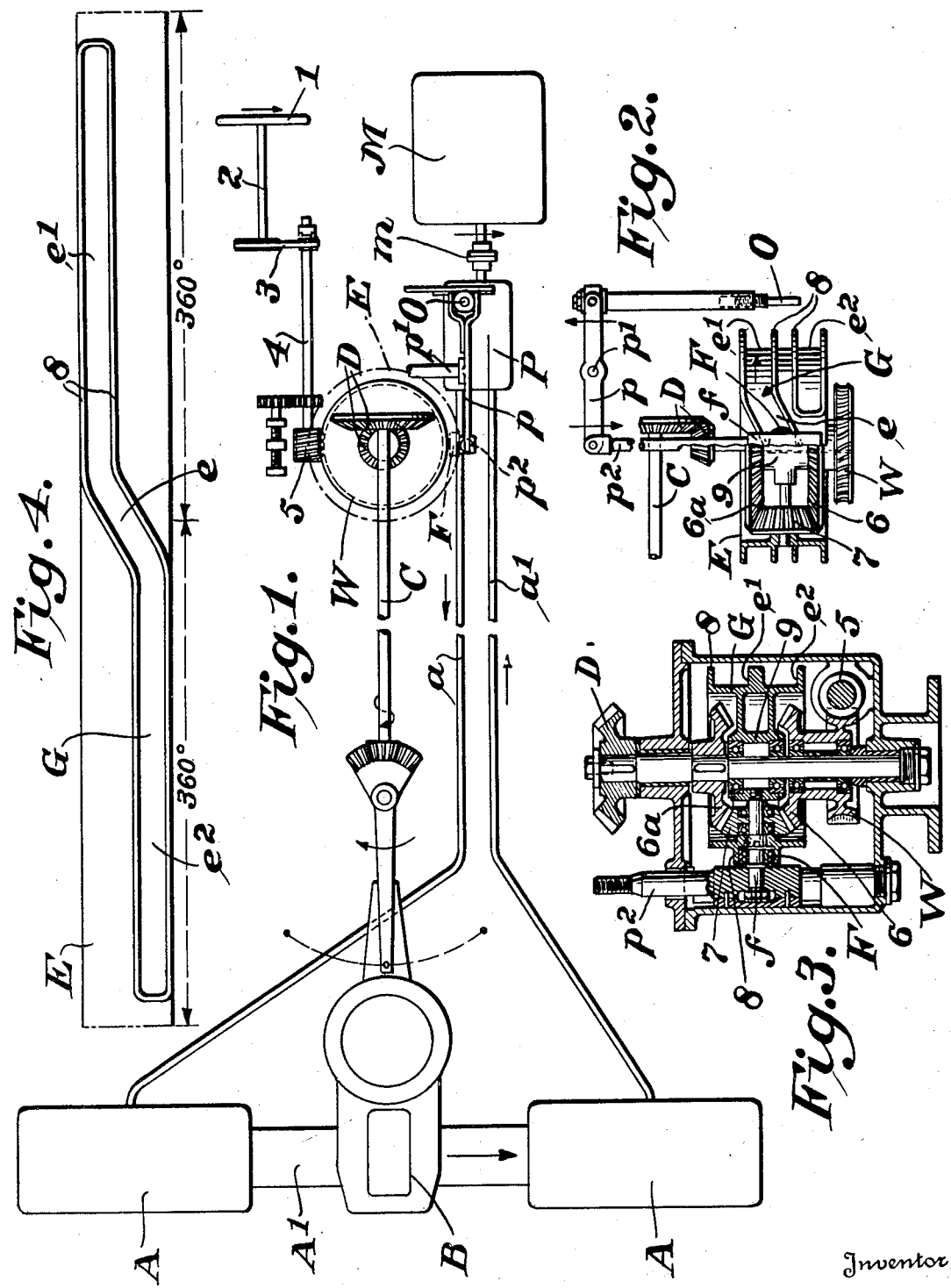
Inventor:
Andrew M. Butterfield,
By Spear, Donaldson & Hall
Attorneys.

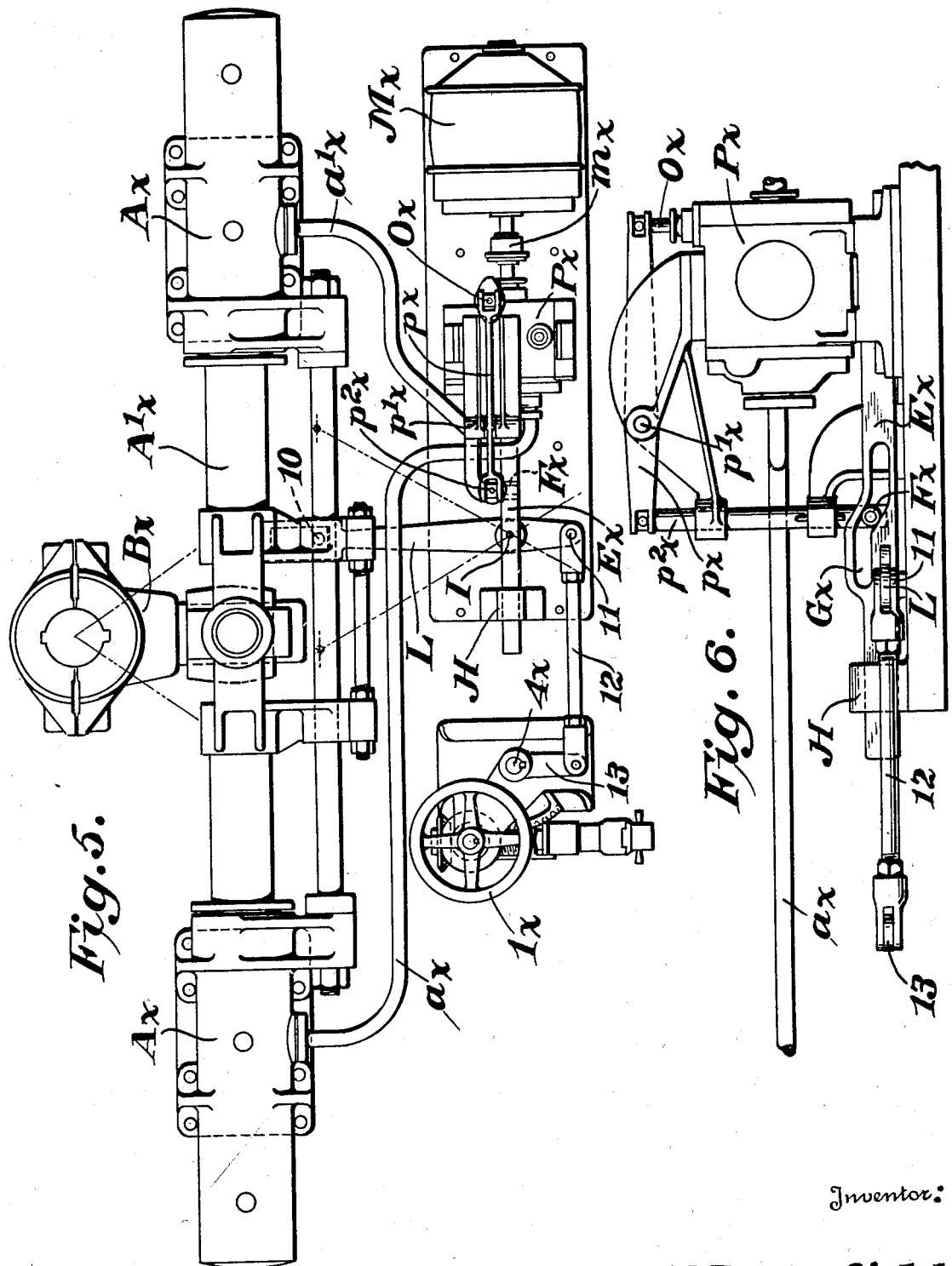

Patented Mar. 5, 1935

1,993,475

UNITED STATES PATENT OFFICE 1,993,475

STEERING GEAR

Andrew Maurice Butterfield, Bath, Maine

Application May 13, 1933, Serial No. 670,984

8 Claims. (Cl. 60—52)

The invention concerns ship steering mechanism and includes a cam member for controlling the degree and direction of the stroke of the pump, said cam being in turn adjusted by connection from a suitable control at the will of the operator, and by connection from follow-up mechanism leading back from the rudder.

The types of pump spindle control mechanisms in common use have certain inherent limitations which it is the purpose of the present invention to overcome. From any given stable position, with such mechanisms, the movement of the mechanism under manual control is limited by the permissible movement of the pump spindle. Since this may effect but a portion of the total desired rudder displacement, to accomplish the remaining movement of the rudder, the manually controlled means must again be actuated after stable conditions again obtain but in the new rudder position and this operation must be repeated until the rudder reaches its final desired position. Or, it may be possible, to continue the movement of the manually controlled means after the initial limit point is reached so as to keep it as nearly as possible in step with the follow up action from the rudder, in an effort to retain the pump spindle in fully opened position until the desired rudder position is reached. In either case, however, the pump does not constantly operate at its maximum rate of discharge because the pump spindle will be in constant motion, opening and closing while the rudder is moving.

With the control mechanism of this invention, this objectionable operation is overcome as a cam is interposed in the control mechanism and this cam is so shaped that however far it is displaced from a central position, the pump spindle which it operates will not be moved beyond its stroke limit. This is true whether the cam is operated under manual control or by the rudder taking charge and it is therefore apparent that it is impossible to impose breaking stresses upon the control mechanism. Further, the shape of the cam retains the pump spindle at fully opened position throughout its movement from one stable position to another, however, great this movement may be, except for a short period at initial opening and final closing. Also, it will be noted that the manually controlled means can, in one setting, be directly moved to any equivalent rudder position, thus dispensing with the necessity in the older types of repeated settings or slow movement in step with the follow up action.

An important advantage of the present control mechanism lies in the fact that with it a smaller capacity pump and pump motive power may be used. This is because the maximum output of the pump is maintained throughout nearly the entire rudder movement, the cam dwells assuring this position of the pump spindle. In contrast with this, the repeated opening and closing, as has been pointed out, of former control mechanisms permits utilization of a fractional part only of the pump capacity with the result that to maintain a desired average discharge a larger pump and pump motive power is required.

In the drawings

Figure 1 is a plan view of a diagrammatic character of one embodiment of my invention.

Figure 2 is a side view of the pump controlling cam and operating mechanism therefor of Figure 1.

Figure 3 is a vertical sectional view of Figure 2.

Figure 4 is a developed view of the cam of Figure 1 alone.

Figure 5 is a plan view of a diagrammatic character of another embodiment of my invention.

Figure 6 is a side view of the pump, the pump controlling cam and the operating mechanism associated therewith of Figure 5.

In the drawings, A, A, are two cylinders in alignment with each other operating a double plunger rod $A^1$ connected to the tiller B connected with the rudder, all as in common practice. The plungers in said cylinder are operated by hydraulic pressure through pipes $a$, $a^1$ from a variable delivery pump P, that is, reversible according to its setting under control mechanism designed for that purpose. This pump is operated by a motor M connected thereto through a coupling $m$. The Waterbury pump for example, disclosed in Patents Nos. 924,787 and 1,108,443, is of well known construction and operation; sufficient to say that by means of a control spindle O it may be set to neutral position where it would not deliver hydraulic pressure to the cylinders A, A, or it may be set to perform various strokes for delivering hydraulic pressure to the cylinders to different degrees, or it may be set to reverse the stroke so that hydraulic power instead of being delivered, say, through pipe $a$, will be delivered through pipe $a^1$. The motor M always runs in one direction. The control rod or pump spindle O is operated to vary the action of the pump by a lever $p$ pivotally mounted at $p^1$ and connected by a rod $p^2$ to a suitable carrier $f$ for a cam roller F, which cam roller engages a groove or guideway G in a cam member E. This cam member is operable from a suitable source of power, for instance, the manually operated "trick" wheel 1 through suitable connections involving, for instance, the shaft 2, gearing 3, shaft 4, worm gear 5 to the worm wheel W, which is connected with a bevel gear wheel 6 forming part of mechanism for operating the cam E.

This mechanism may vary in its construction, but as one form of such mechanism I have illustrated a differential gear arrangement involving a plurality of bevel pinions 7 meshing with the bevel gear wheel 6, said pinions being mounted on axles or spindles connected with the cam member E. In the particular embodiment chosen to illustrate the invention, but to which specific form the invention is not limited, I have shown this cam member in the form of a circular shell having outstanding flanges 8 forming the cam groove G. The spindles of the bevel pinions are supported in a central block 9 of this control mechanism, which block lies between the bevel gear wheel 6 and a coaxially arranged bevel gear 6a with which mesh the pinions 7. This second bevel gear 6a is controlled by follow-up mechanism extending from the rudder and which may be of any suitable construction. This follow-up mechanism is shown diagrammatically in the drawings connected to a shaft C which operates through bevel gears at D a vertical shaft coaxial with the axes of the bevel gears 6, 6a, and connected to the latter 6a.

The cam groove or runway of the cam E has an intermediate inclined portion $e$ and horizontal extensions $e^1$, $e^2$, located respectively at the upper and lower ends of the inclined portion $e$ and forming continuations thereof.

When the steering apparatus is in neutral position, the cam roller F will be located midway of the inclined portion $e$ of the cam groove, and the pump will be in neutral position and no hydraulic pressure will be delivered therefrom to either of the cylinders A. When the control force is applied to the steering apparatus, as, for instance, by turning the "trick" wheel manually, the worm wheel W will be operated, together with the bevel gear wheel 6, and as the follow-up mechanism including the bevel gear 6a is now the standing part, the planetary bevel pinions 7 will roll on the upper bevel gear wheel 6a and the cam E will be rotated and its cam groove will give movement to the cam roller F and control spindle O will be adjusted through the described connection to start the pump P and thus apply hydraulic power to the proper one of the cylinders A for operating the rudder. The follow-up action will now be inaugurated by the movement of the rudder and this action will be transmitted through follow-up shaft C, bevel gearing D and the upper bevel gear 6a of the differential, which now will be rotated, this no longer presenting, as before, a standing part on which the bevel pinions will roll.

It will be understood that the movement of the cam will bring the pump into operation and that the stroke of the pump will be varied, i. e., increased or decreased, by the degree of movement imparted to the spindle O by the cam, and beyond a certain limit any further movement of the cam will not vary the stroke, but, on the contrary, will hold the stroke of the pump constant due to the horizontal extension of the cam groove, and the follow-up motion from the steering gear in case it over travels due to excessive pressure causing the relief valves to blow or other causes allowing the rudder to take charge will not cause damage to any part of the control or pump. In other words, at the completion of the vertical movement of the cam roller F, due to the inclined middle section of the cam groove of cam E, the roller, upon further movement, will enter the horizontal portion of the cam groove and the pump's stroke will be maintained without variation. By the control described, involving the cam with the horizontal portions or dwells, it is possible to adjust the pump to its full stroke and hold it at this stroke to utilize its full capacity.

I do not limit myself to the differential gearing as a means for operating the cam, nor to the particular follow-up connections.

The type of pump may be the Waterbury, or any form of reversible, variable (stroke or delivery) pump.

Referring to the embodiment of the invention shown in Figures 5 and 6, those elements which are similar to the corresponding element in Figures 1 to 4 have been given the same reference character with the subscript $x$, and the description of Figures 1 to 4 may be read in connection with Figures 5 and 6 with this substitution in mind.

The essential distinguishing feature of Figures 5 and 6 concerns the application of the cam to a sliding member. Instead of the cam $G_x$ being upon a cylindrical surface it is formed in the longitudinally reciprocable bar $E_x$ guided as by the bearing block H. Pivotally connected to the bar $E_x$ at I is a floating lever L. One end of the lever L is connected at 10 to a suitable part of the plunger $A_x^1$. The other end of the lever L is connected at 11 to the link 12 which is operated by the crank arm 13 mounted on the shaft $4_x$.

In the operation of this mechanism when the bar $E_x$ is moved from a neutral position by the link 12, the roller $F_x$ will be moved to an operating position and remain there until movement of the plungers cause a follow-up of the link L to restore the bar $E_x$ to its neutral position. The details of this operation will be understood from the descriptions of operation of the mechanism of Figures 1 to 4.

I claim:

1. In hydraulic steering gear having a rudder, a fluid pressure motor for moving the rudder, and a variable stroke reversible pump for actuating the motor to variably position the rudder, means for controlling the pump, comprising a cam having an inclined portion and dwells at the ends of said inclined portion, said cam being movable only in the direction of extent of the dwells and not transversely thereto, a member movable only in a direction transverse to the direction of motion of the cam, engaging with and being operated by the inclined portion of said cam for determining the length and direction of the pump stroke, said dwells retaining said member in substantially a fixed pump-stroke position upon movement of the cam in addition to that determining the length and direction of the pump-stroke, control means for operating the cam, and follow-up mechanism actuated by movement of the rudder for restoring the inclined portion of the cam to said member to move the member to mid pump stroke position, substantially as described.

2. In hydraulic steering gear having a rudder, a fluid pressure motor for moving the rudder, and a variable stroke reversible pump for actuating the motor to variably position the rudder, means for controlling the pump, comprising a cam having an inclined portion and dwells at the ends of said inclined portion, a member movable only in a direction transverse to the direction of motion of the cam, engaging with and being operated by the inclined portion of said cam for determining the length and direction of the pump stroke, said dwells retaining said member in substantially a fixed pump-stroke position upon movement of the cam in addition to that determining the length and direction of the pump-stroke, control means for operating the cam, follow-up mechanism actuated by movement of the rudder for restoring the inclined portion of the cam to said member to move the member to mid-pump stroke position, and differential gearing connected with the cam, said differential gearing being operated by the control means and by the follow-up connections.

3. In hydraulic steering gear having a rudder, a fluid pressure motor for moving the rudder, and a variable stroke reversible pump for actuating the motor to variably position the rudder, means for controlling the pump, comprising a cam having an inclined portion and dwells at the ends of said inclined portion, a member movable only in a direction transverse to the direction of motion of the cam, engaging with and being operated by the inclined portion of said cam for determining the length and direction of the pump stroke, said dwells retaining said member in substantially a fixed pump-stroke position upon movement of the cam in addition to that determining the length and direction of the pump-stroke, control means for operating the cam, follow-up mechanism actuated by movement of the rudder for restoring the inclined portion of the cam to said member to move the member to mid-pump stroke position, the cam being in the form of a rotary member having planetary pinions mounted thereon, and gears with which said pinions mesh, one gear being operated by the control means and the other gear being operated by the follow-up connections, substantially as described.

4. In a hydraulic steering gear having a rudder, a fluid pressure motor for moving the rudder and a variable stroke reversible pump for actuating the motor to variably position the rudder, means for controlling the pump, comprising a cam having an inclined portion and dwells at the ends of said inclined portion, a member movable only in a direction transverse to the direction of motion of the cam, engaging with and being operated by the inclined portion of said cam for determining the length and direction of the pump stroke, said dwells retaining said member in substantially a fixed pump-stroke position upon movement of the cam in addition to that determining the length and direction of the pump-stroke, control means for operating the cam, follow-up mechanism actuated by movement of the rudder for restoring the inclined portion of the cam to said member to move the member to mid-pump stroke position, the cam having a cam groove on its exterior, and differential gearing within the cam operated by the control means and by the follow-up mechanism.

5. A hydraulic steering gear according to claim 1, in which the cam is associated with a sliding member capable of reciprocation only, and said control means and follow-up mechanism operate said sliding member.

6. A hydraulic steering gear according to claim 1 in which the cam is associated with a longitudinally reciprocable member, a floating lever connected to said reciprocable member, and said control means and follow-up mechanism operate said floating lever.

7. In hydraulic steering gear having a rudder, a fluid pressure motor for moving the rudder, and a variable stroke reversible pump for actuating the motor for variably positioning the rudder, means for controlling the pump, comprising a movable member connected to the pump for determining the length and direction of the pump stroke, a second movable member having means for actuating said first member through a limited distance and thereafter holding said first member substantially in its limited position during continued movement of the second member, said first movable member being movable only in a direction transverse to the direction of motion of the second movable member, and said second member being capable of simple motion only, control means for operating said second member and follow-up mechanism actuated by movement of the rudder for restoring said second member to its position determining mid-stroke pump position.

8. In hydraulic steering gear having a rudder, a fluid pressure motor for moving the rudder, a variable stroke reversible pump for actuating the motor to variably position the rudder, and means for controlling the pump, said means comprising a movable cam member having a cam slot, said cam slot having an inclined portion and dwells at the ends of said inclined portion, a follower member movable only in a direction transverse to the direction of motion of the cam member having a portion directly engaging with said cam slot and being operated by the inclined portion thereof for determining the length and direction of the pump stroke, said dwells retaining said follower member in substantially a fixed pump stroke position upon movement of the cam member in addition to that determining the length and direction of the pump stroke, control means for operating the cam member, and follow-up mechanism actuated by movement of the rudder for restoring the inclined portion of the cam slot to said follower member to move the follower member to mid pump stroke position.

ANDREW MAURICE BUTTERFIELD.